Nov. 15, 1966  R. H. JONES ET AL  3,286,161

MAGNETO-RESISTIVE POTENTIOMETER

Filed Dec. 4, 1963

INVENTORS
RONALD H. JONES
WILLIAM O. EVANS, JR.
BY
ATTORNEYS 3,286,161
MAGNETO-RESISTIVE POTENTIOMETER
Ronald H. Jones and William O. Evans, Jr., San Diego, Calif., assignors, by mesne assignments, to the United States of America as represented by the Secretary of the Navy
Filed Dec. 4, 1963, Ser. No. 328,142
2 Claims. (Cl. 323—94)

This invention relates to potentiometers and is particularly directed to non-frictional devices for varying resistance and/or voltage in response to mechanical motion. More specifically this invention relates to magneto-responsive devices employing semi-conductors, the electric resistance of which is variable by, and a function of, the magnitude of a transverse magnetic field.

An object of this invention is to provide an improved potentiometer in which sliding contacts and the mechanical wear thereof are obviated.

The object of this invention is attained by an array of magneto-resistive elements, each element being of a material having a resistance between terminals which is variable in response to the movement of a transverse magnetic field. The terminals of the elements are connected preferably in series in a balanced bridge. A magnet with poles disposed in either side of the magnetic elements produces a transverse field through the elements, the field being shiftable along the array of elements to differentially change the resistances of the spaced elements. The bridge is well adapted for precisely sensing balance as well as imbalance of the resistances of the bridge. All mechanical wear is obviated.

Other objects and features of this invention will become apparent to those skilled in the art by referring to the specific embodiments described in the following specification and shown in the accompanying drawings in which.

Figure 1:
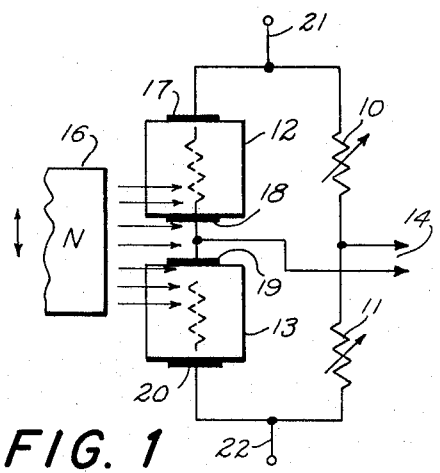
FIG. 1 is a circuit diagram of one magneto-resistive potentiometer embodying this invention.

In FIG. 1 is shown a four-sided bridge including impedance elements 10, 11, 12 and 13. The output leads 14 are connected across one diagonal of the bridge. The impedance elements 10 and 11 may be resistive, as shown, while the impedance elements 12 and 13 are, according to this invention, resistive in nature and are responsive to a transverse magnetic field. The field indicated by one pole of the magnet 16, is movable lengthwise along the resistive elements 12 and 13 so that the magnetic field intensity differentially varies as between the two elements 12 and 13. That is, in either extreme position, the magnetic field is a maximum through one element and is substantially zero through the other.

It is contemplated that the elements 12 and 13 be of magneto-resistive material in which the electrical resistance between the terminals thereof varies as a function of the magnitude of a magnetic field perpendicular to the direction of current flow. It has been found that indium antimonide has a relatively high resistive coefficient and is well adapted to the uses contemplated here. Preferably the indium antimonide body is a relatively thin wafer. Terminals 17, 18, 19 and 20 in FIG. 1 are provided at the edges of the wafers by soldering, metallic paint, or vacuum deposition, to which the external circuit connections may be made.

It is a simple matter to balance the bridge for any given position of magnet 16 with respect to magneto-resistive elements 12 and 13, by adjustment of either or both of the conjugate resistors 10 and 11. Then, movement of the magnet in either direction will unbalance the bridge to couple in varying amounts the output 14 to any exciting voltage that may be applied to terminals 21 and 22 across the vertical diagonal of the bridge.

In case the magneto-resistive elements of FIG. 1 become subject to temperature changes and drift in resistance values it has been found according to this invention, feasible to employ the Hall effects of the elements. The Hall coefficient, $R_h$, of indium antimonide as well as other commercially obtainable ceramics, is relatively high. The Hall coefficient may be defined by the expression $$R_h = \frac{E_y}{J_x H_z}$$

where $E_y$ is the transverse electric field developed in the $y$ direction when a current density $J_x$ flows in the $x$ direction through a magnetic field $H_z$ in the $z$ direction. The subscripts $x$, $y$, and $z$ indicate the usual $x$, $y$ and $z$ orthogonal axis of the cell element.

Figure 2:
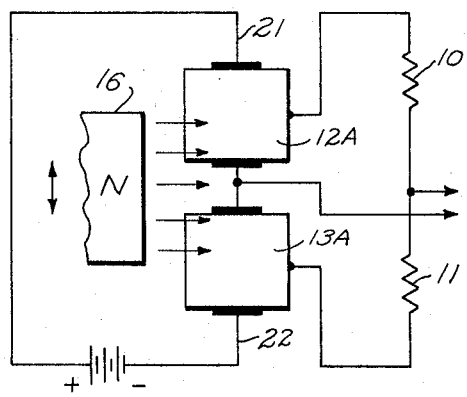
FIG. 2 is a circuit diagram of another embodiment of this invention.

As shown in FIG. 2 the biasing source is applied directly to the end terminal 21 and 22 of the series of Hall magneto-resistive wafer elements 12a and 13a. The output terminals of these elements are attached by spots of solder to the side edges of the elements and are connected to the bridge resistors 10 and 11. The magnetic field is disposed perpendicular to the face of the wafer elements and is movable across the face of the elements to differentially vary the magnetic field and Hall voltage of the two elements. Hall generators are commercially obtainable. One, known as the Siemens Hall generator SBV-536, has been found to have a relatively high Hall coefficient, producing a substantial voltage at the edges of the wafers.

Figure 4:
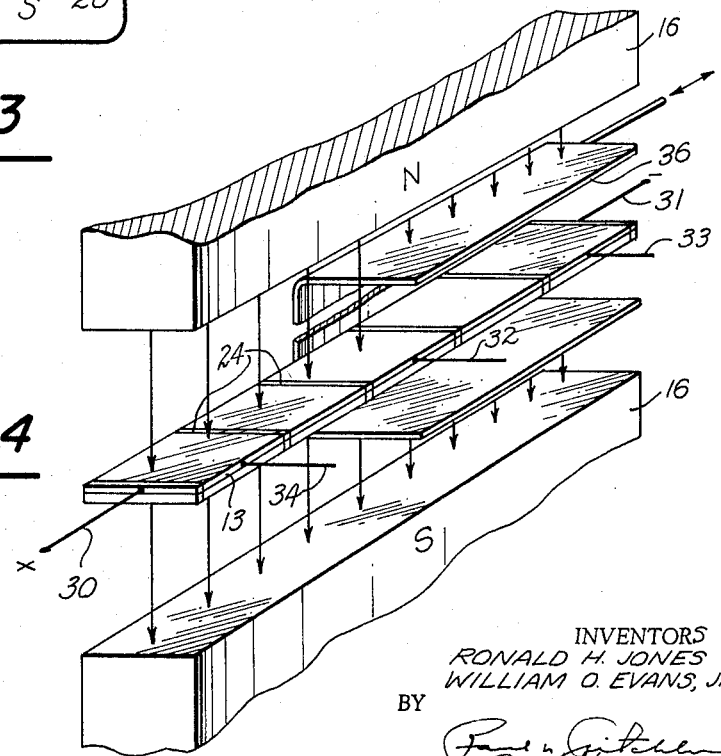
FIG. 4 is a partly exploded view of the FIG. 3 embodiment showing in perspective the pole pieces of the device of this invention.

According to the embodiment shown in FIG. 4 a larger number of Hall cells may be connected in series to increase the Hall voltage. As shown, five cells are mounted end to end and are disposed between the poles of the magnet 16. If desired, the array may comprise a coating of indium antimonide or other suitable ceramic on the face of a supporting insulating substrate. Transverse strips 24 of conducting metal are painted or plated upon the substrate will divide the strip array into separate cells. The transverse strip tends to keep uniform the current density throughout the cross-section of the strip as the current flows from one end terminal to the other, and to increase the Hall voltage. Substantial control current is applied through the control terminals 30, 31. Preferably the number of cells is odd so that the center terminal 32 is equal distance from the end Hall terminals 33 and 34. Terminals 32, 33, and 34 may then, if desired, be connected into a balanced bridge of the type shown in FIGS. 1 or 2.

According to another feature of this invention the field may be differentially shifted along the array by a magnetic shield 36. As shown, in FIGS. 3 and 4 shield 36 is U-shaped and is movable length-wise of the strip. The cells shaded by the shield receive effectively no magnetic field and produce no Hall voltage. As the field moves from right to left in FIG. 4 the Hall voltage increases at terminal 33 and decreases at terminal 34, all voltages being measured with respect to the center terminal 32.

Figure 3:
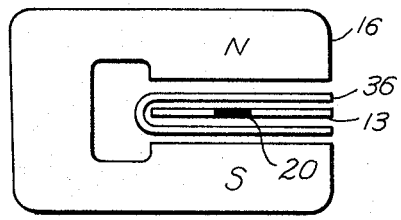
FIG. 3 is an end view of yet another embodiment of this invention.

FIG. 3 shows an end view of the exploded assembly of FIG. 4 and illustrates the relative position of the cell 13 the shield 36 and the magnet 16.

What is claimed is:

1. An array of series-connected Hall-cell elements, each element being of a material which produces a voltage which is a function of applied orthogonal magnetic and electric fields, the array of elements comprising an elongated strip of said material deposited on a supporting insulated substrate with spaced transverse strips of conducting metal to divide said material into serially connected end-to-end rectangular Hall-cell wafers,
- a voltage source connected to the end terminals of said array for applying said electric field to said cells;
- a magnet with poles disposed on opposite sides of said array of elements to produce the transverse magnetic field;
- means for shifting said magnetic field along said array for differentially changing the Hall voltage across said elements; and
- means for reading out the Hall voltages of said spaced elements, comprising output leads connected to the side edges of said wafers.

2. The array defined in claim 1 comprising an odd number of said Hall-cell wafers so that at least one of said output leads may be connected at the electrical center of said strip.

References Cited by the Examiner
UNITED STATES PATENTS

| | | | |
|---|---|---|---|
| 2,905,874 | 9/1959 | Kelling | 324–34 |
| 3,024,997 | 3/1962 | Sun | 324—45 X |
| 3,030,574 | 4/1962 | Nissenson | 324—34 |
| 3,061,771 | 10/1962 | Planer et al. | 324—94 |
| 3,187,254 | 6/1965 | Wasserman | 323—94 X |

JOHN F. COUCH, *Primary Examiner.*

A. D. PELLINEN, *Assistant Examiner.*